United States Patent [19]

Sawa et al.

[11] Patent Number: 5,087,017
[45] Date of Patent: Feb. 11, 1992

[54] VALVE BODY FOR NON-SLIDING TYPE GATE VALVE

[75] Inventors: Toshio Sawa, Sayama; Norikimi Irie, Tokyo; Yuzo Hayashi, Kawagoe, all of Japan

[73] Assignee: Irie Koken Kabushiki Kaisha, Tokyo, Japan

[21] Appl. No.: 499,336
[22] PCT Filed: Jan. 10, 1990
[86] PCT No.: PCT/JP90/00020
§ 371 Date: Jun. 12, 1990
§ 102(e) Date: Jun. 12, 1990
[87] PCT Pub. No.: WO90/08275
PCT Pub. Date: Jul. 26, 1990

[30] Foreign Application Priority Data
Jan. 10, 1989 [JP] Japan .................................. 1-1940

[51] Int. Cl.$^5$ .................................................. F16K 3/16
[52] U.S. Cl. ...................................... 251/175; 251/195
[58] Field of Search ........................ 251/175, 193, 195

[56] References Cited
U.S. PATENT DOCUMENTS
3,524,467 8/1970 Worley ............................. 251/175 X
3,717,322 2/1973 Bernard ............................ 251/175 X
4,157,169 6/1979 Norman ................................ 251/195
4,381,100 4/1983 Schoenberg .................... 251/175 X Primary Examiner—John C. Fox
Attorney, Agent, or Firm—Amster, Rothstein & Ebenstein

[57] ABSTRACT

A non-sliding gate valve includes a valve housing and a valve body, the valve body having a paired valve plate and a counter plate disposed within the valve housing in parallel with each other. Also included are a pair of inner supports, each made of a metallic circular plate and arranged in parallel with each other, an outer support arranged outside the inner supports, and a pair of annular elastic connecting sheets arranged radially between the inner and outer supports and in parallel with each other, with a gap being left therebetween. The valve and counter plates are sealingly connected to the confronting inner supports, respectively; and the inner and outer supports are sealingly secured at their peripheries to the annular sheets at their inner and outer diameter portions, respectively. The annular sheets are each formed with at least one annular corrugation on their surfaces, a sealed space being formed between the inner and outer supports and the annular sheets so as to be connected to a pressurized fluid source.

2 Claims, 3 Drawing Sheets

VALVE BODY FOR NON-SLIDING TYPE GATE VALVE

TECHNICAL FIELD

The present invention relates to a gate valve and more particularly to a valve body for a non-sliding type gate valve for high vacuum use.

BACKGROUND ART

Conventionally, such a gate valve for high vacuum use generally comprises a valve housing, and a valve body mounted thereto adapted to open and close the valve opening formed in the valve housing. The valve body comprises a valve plate and a counter plate arranged opposite to each other, and the valve plate is adapted to close the valve opening by being urged against the valve seat formed in the valve housing. In a gate valve of this kind, in order to urge the valve body against the valve seat to perform a sealing action thereto, mechanism such as those using a linkage, a shifting mechanism with taper blocks, or a mechanism utilizing balls or rollers, etc. have been used.

However, it has been well-known that these mechanisms reveal various problems in that they all have members such as rolling members, shifting members, etc., which move relative to each other, so that during the use of the gate valve in a highly vacuum atmosphere the relatively moving members may become clogged, making the opening or closing of the valve body impossible, its rapid opening or closing impossible, or dust may be generated due to the relative movements of the members, etc.

In order to solve these problems to some extent, gate valves have already been proposed in which as a sealing mechanism a metallic bellow, diaphragms, etc. are used, and two types of these valves are known, i.e. one in which double bellows are arranged concentrically on the valve seat confronting the valve plate, the other in which a metallic bellows is arranged between the valve plate and the counter plate. Among these types, in the former, since the bellows is arranged at the side of the valve seat it has a complicated constitution, and is thicker and excessively heavy in comparison with the latter type. On the other hand, the latter type has such defects that, since the weight of the valve plate portion is great owing to the arrangement of the metallic bellows, a guide mechanism for preventing the valve plate from oscillations, etc., the relatively sliding portions need to be provided within a high vacuum environment.

Thus, it will be apparent that in these proposed gate valves for high vacuum use there are also various problems in their constitution.

As a gate valve for high vacuum use, the present applicant has already proposed an invention entitled "A Non-Sliding Gate Valve for High Vacuum Use" as Japanese Patent Application No. 62-86937, filed on Apr. 10, 1987, for the purpose of resolving the problems inherent to hitherto known gate valves.

As apparent from the Specification and drawings of the above previously proposed patent application, this "non-sliding gate valve for high vacuum use" has the following constitution as shown in FIGS. 2 and 3 of the appended drawings.

The gate valve comprises a hollow box-like valve housing 1 having substantially an elliptical configuration when viewed in an elevational view and of a shallow depth when viewed from the side, and a valve body 2 disposed therein and having substantially a circular plate-like shape, the valve body 2 being adapted to close or open the valve opening $1_1$ formed axially in the valve housing 1. On the outside of the valve housing 1, on its top wall 3 a pair of brackets $4_1$, $4_2$ are vertically secured thereto with a gap being left therebetween in the longitudinal direction of the top wall 3 (see FIG. 3), a bearing member 5 having substantially an inverted U-shaped configuration being disposed within the gap between the brackets $4_1$ and $4_2$ with its leg members $5_1$ and $5_2$ being pivoted to the confronting brackets $4_1$ and $4_2$, respectively, by pivot $6_1$ and $6_2$, respectively. The central web portion $5_3$ of the bearing member 5 has a hollow bar-like rod 7 centrally secured near its upper end portion, the valve body 2 being radially secured to the rod 7 at its lower end. Swingably secured on the outside of the valve housing 1 is an air cylinder 8 at its piston rod end so that its center line orthogonally intersects the longitudinal axis of the valve housing 1 (see FIGS. 2), whereby the end of the piston rod of the air cylinder 8 is swingably connected to the rod 7 near its upper end portion and above the bearing member 5 having an inverted U-shaped configuration. Thus, by actuating the air cylinder 8 to extend or retract the piston rod, the rod 7 is swung together with the bearing member 5 secured thereto about the pivots $6_1$, $6_2$ relative to the brackets $4_1$, $4_2$ secured to the valve housing 1. Therefore, the valve body 2 secured to the rod 7 at its lower end portion can be selectively swung to a position indicated at the solid lines in FIG. 2 where it closes the valve opening $1_1$, or to a position indicated at the phantom lines in FIGS. 2 where it opens the valve opening $1_1$.

As shown in FIG. 3 the valve body 2 comprises a valve plate 10, a counter plate 11, both arranged in line with the center line of the valve opening $1_1$, and a metallic bellows 13 sealingly connecting the valve plate 10 and the counter plate 11 at their opposing outer peripheries. The valve plate 10 and the counter plate 11 are respectively made of a circular metallic plate of substantially identical dimensions, and respectively constituted from a pressure-resisting metallic concave dish-like plate 14, 15, a sealed space 16 being defined by the valve plate 10, counter plate 11, and metallic bellows 13, and is adapted such that, when pressurized air is supplied to it from the outside through a passage $7_0$ formed in the rod 7 to which the valve valve body 2 is secured at its upper portion, the metallic bellows 13 is urged to expand against its elasticity so that the valve plate 10 and the counter plate 11 are respectively urged against the valve seat 17 formed around the valve opening $1_1$ and against the wall 18 formed within the valve housing 1 opposite the valve opening $1_1$ which constitutes a counter plate receiving seat for the counter plate $1_1$, thereby the counter plate 11 acting to assist the valve plate 10 being strongly urged against the valve seat 17 to sealingly close the valve opening $1_1$. Inversely, in order to open the valve opening $1_1$ from this closed state, upon discharge of the pressurized fluid from the sealed space 16, the bellows 13 contracts due to its elasticity, resulting in the separation of the valve plate 10 from the valve seat 17, and, in this case, the separation of the counter plate 11 from the counter plate receiving seat 18 is assisted by the action of a compressive coil spring (not shown) disposed outside the valve housing 1.

DESCRIPTION OF THE INVENTION

It was confirmed that the above gate valve previously proposed by the present applicant and having a constitution as above described could well achieve the aimed objects, but it was also found that when the valve body 2 was to be opened the valve plate 10 was not necessarily opened smoothly by the contractive force generated by the elasticity of the metallic bellows 13 also. Although, in this gate valve, by way of preventing a possible occurrence of such a difficulty a compression spring means 20 was provided so as to connect the valve and counter plates 10, 11 together, the spring means 20 brought about another problem in that it complicates the constitution of the gate valve, and as the spring means 20 is exposed within the valve housing 1 it affects the fluid flowing within the valve housing 1.

Accordingly it is an object of the present invention to provide an improved valve body for a non-sliding type gate valve, in particular one for high vacuum use which can solve the above problems found in the gate valve previously proposed by the present applicant.

In order to achieve the object, in accordance with the present invention, a valve body for a non-sliding type gate valve for high vacuum use which comprises a paired valve plate and a counter plate, the valve and counter plates each made of a circular thin metal plate having an outer diameter sufficient to close said valve seat formed in the valve housing and each having their center lines arranged in line with a center line of the valve opening and in parallel with the valve seat as well as each other with gaps being left between the valve seat as well as therebetween, a pair of inner support members arranged within the gap between the valve plate and the counter plate so as to be concentric with them and in parallel with each other, each of the inner support members having an outer diameter smaller than the outer diameter of the valve and counter plates, an outer support member arranged radially outside the inner support member and made of an annular metal body having an inner diameter larger than the outer diameter of the valve and counter plates with a width substantially equal to the sum of the thicknesses of the inner support members, and a pair of annular elastic connecting sheets arranged between the outer peripheries of the inner support members and the inner periphery of the outer support member, each being made of a thin metal sheet, the valve and counter plates sealingly connected to the inner support members, respectively, to confront them, the inner peripheries of the inner support members and the inner periphery of the outer support member being sealingly secured to the annular elastic connecting members at their inner and outer peripheries, respectively, each of the annular elastic connecting sheets formed with at least one concentric corrugation on the surface thereof and perpendicular thereto, a sealed space being formed between the inner support member, the annular elastic connecting sheets and the outer support member.

BEST MODE FOR CARRYING OUT THE INVENTION

Figure 1:
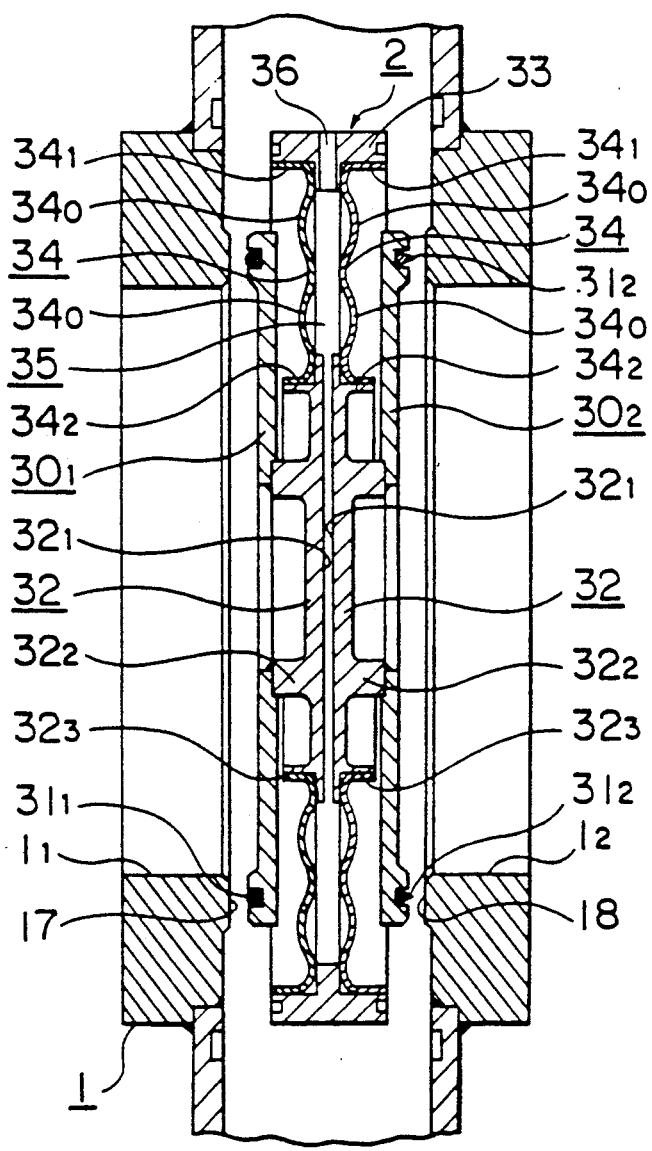
FIG. 1 is a vertical sectional view of a principal portion of one embodiment of the present invention.
Figure 2:
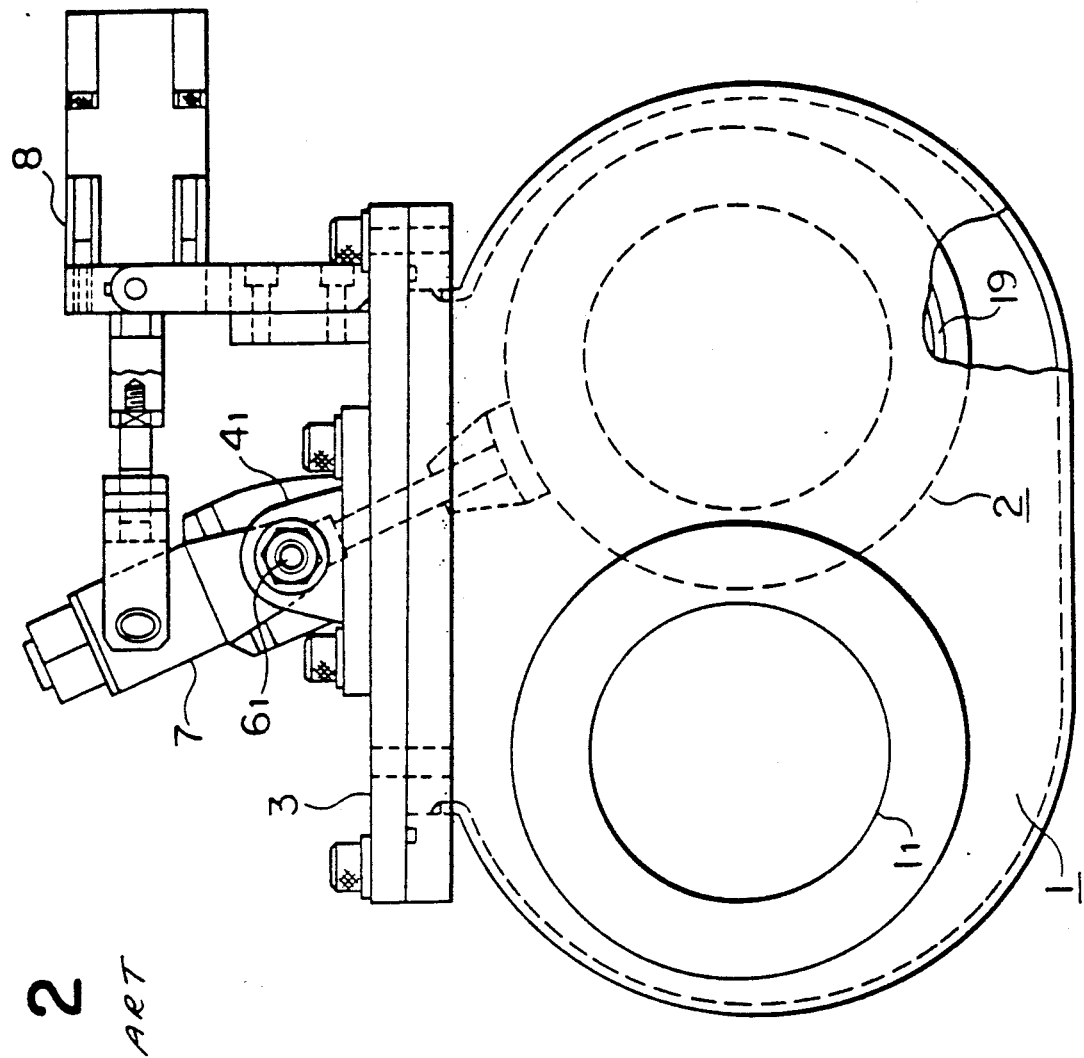
FIG. 2 is an elevational view of a gate valve previously proposed by the present applicant, partially in section.

A gate valve in accordance with the present invention comprises, as shown in FIG. 1, a valve housing 1 and a valve body 2 disposed within the valve housing 1 adapted to open or close the valve opening $1_1$ axially formed in the valve housing 1. Although not precisely shown in FIG. 1, as shown in FIG. 2 the valve housing 1 has substantially an elliptical configuration when viewed in a front elevational view, while the valve body 2 has substantially a circular configuration when viewed in a front elevational view as shown in FIG. 2 by the solid lines, and is so constituted that it occupies within the substantially elliptical valve housing 1 a position confronting the the valve opening $1_1$ in preparation for closing it as shown at the solid lines in FIG. 2, and a position displaced from the valve opening $1_1$ as shown by the phantom lines in FIG. 2 after being swung from the first position in a plane bisecting the depth of the valve housing 1. When the valve body 2 swings between the two positions the valve body 2 is in a contracted state as shown in FIG. 1 so that there is no relative sliding motion between the valve seat 17 and the counter plate receiving seat 18 formed in parallel with the valve seat 17 within the valve housing 1 during the swing movement of the valve body 2 between the above two positions.

The valve body 2 in accordance with the present invention comprises, as shown in FIG. 1, a valve plate $30_1$ and a counter plate $30_2$, respectively confronting the valve seat 17 and the counter plate receiving seat 18 formed in the valve housing 1 so as to be coaxial with the valve seat 17 as well as the counter plate receiving seat 18 and in parallel with each other in a spaced relationship, the valve plate $30_1$ and the counter plate $30_2$ being paired and each made of substantially a thin annular metallic plate. The surfaces of the valve plate $30_1$ and the counter plate $30_2$ respectively confronting the valve seat 17 and the counter plate receiving seat 18 are arranged, respectively, so as to be in parallel with the seats 17, 18, respectively, and are respectively provided with an annular seal element $31_1$ and support elements $31_2$ so as to sealingly abut the valve seat 17 and be firmly supported on the counter plate receiving seat 18, respectively.

Coaxially disposed between the valve plate $30_1$ and the counter plate $30_2$ are a pair of inner support members 32 one being a support member 32 adjacent the valve seat, and the other being a support member 32 adjacent the counter plate receiving seat. Each is made of a thick circular plate-like metal having an outer diameter somewhat larger than the inner peripheries of the plates $30_1$, $30_2$, the confronting surfaces of the inner support members 32 elongating perpendicular to the center line X—X of the valve opening $1_1$ with a gap being left therebetween. The opposite surfaces are respectively formed with two concentric inner and outermost annular projections $32_2$ and $32_3$, respectively, each of the inner annular projections $32_2$ being sealingly connected such as by welding at its outer surface to the valve plate 30, and counter plate $30_2$ at their inner peripheries, respectively. Coaxially arranged around the outer peripheries of the outermost annular projections $32_3$ of the inner support members 32 is a metallic annular outer support member 33 having an inner diameter larger than the outer diameter of the valve plate $30_1$ and counter plate $30_2$ with an annular gap being left therebetween, the outer support member 33 having a substantial thickness and a width substantially equal to the sum of the thicknesses of the inner support member 32.

Thus, it will be appreciated that there are radial annular gaps left between the outer peripheries of the outer annular projections $32_3$ of the inner support members 32 and the inner periphery of the outer support member 33, respectively. These radial annular gaps are respectively sealingly closed by a pair of annular elastic connecting sheets 34 each made of a thin metal sheet and arranged in parallel with each other at intervals with their outer flanges $34_1$ and inner flanges $34_2$ being sealingly connected to the inner periphery of the outer support member 33 and the outer peripheries of the outer annular projections $32_3$ of the inner support members 32, respectively. Each of the annular elastic connecting sheets 34 is formed with at least one concentric corrugation $34_0$ (two in the embodiment shown) perpendicular to the surface of the connecting sheet 34. Such an annular elastic connecting sheet 34 made of a thin metal sheet with concentric annular corrugations $34_0$ reveals extremely high elasticity, in particular a superior restoring force deriving from the selection of its material and the adoption of a suitable forming process therefore.

Thus, between the confronting surfaces $32_1$ of the pair of the inner support members 32 and between the confronting surfaces of the pair of annular elastic connecting sheets 34 a sealed space 35 is formed, into or out of which a pressurized fluid such as compressed air can be supplied or discharged through a fluid passage 36 radially formed through the outer support member 33, whereby, when the pressurized fluid is supplied within the sealed space 35 the confronting circular-plate like surfaces $32_1$ of the inner support members 32 are pushed outwards by this pressurized fluid, resulting in elastic deformation of the annular elastic connecting sheets 34 so that the valve plate $30_1$ and the counter plate $30_2$ fixedly secured to the outer peripheries of the inner support members 32 are urged towards the valve seat 17 and the counter plate receiving seat 18 respectively formed in the valve housing 1. In this case, the annular elastic sheets 34 themselves are also pushed outwards by the pressurized fluid so that they freely deform outwards against their elasticity, assisting in the movements of the inner support members 32 in that direction. Accordingly, the valve plate $30_1$ and the counter plate $30_2$ abut the valve seat 17 through the annular seal element $31_1$ and the counter plate receiving seat 18 through the support elements $31_2$, perfectly closing the valve opening $1_1$.

Inversely, when the pressurized fluid is discharged through the fluid passage 36 from the inside of the sealed space 35 the annular elastic connecting sheets 34 return to their original states due to their own elasticity, so the inner support members 32, and thus the valve plate $30_1$ and counter plate $30_2$ fixedly secured to them resume their original states as shown in FIG. 1 to open the valve opening $1_1$.

Figure 3:
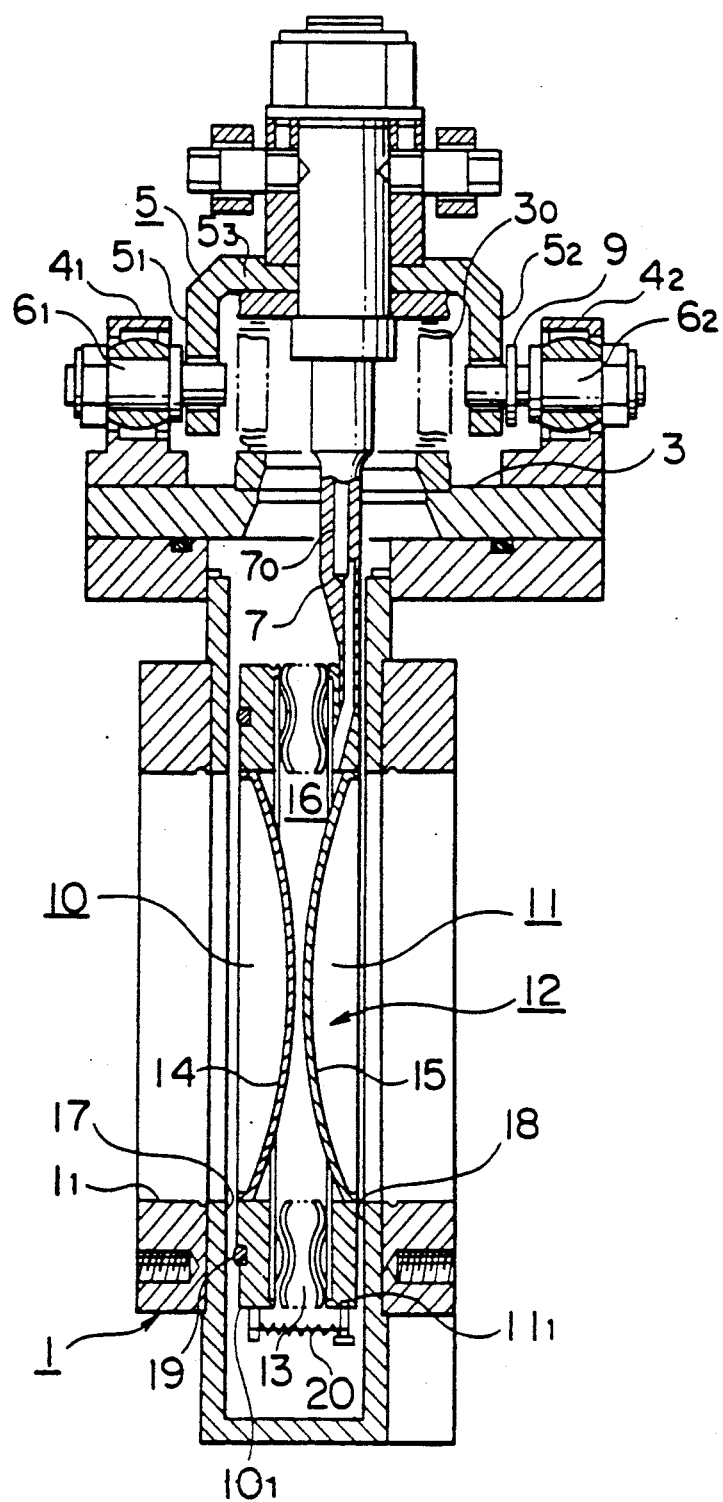
FIG. 3 is a vertical sectional view of the gate valve shown in FIG. 2.

As apparent from the foregoing, the valve body in a gate valve, in particular a non-sliding gate valve for high vacuum use in accordance with the present invention, differs from the known gate valve such as previously proposed by the present applicant in that the opening or closing, in particular opening of the valve plate $30_1$ and the counter plate $30_2$ does not need the action of compression spring 20 as shown in FIG. 3 which was required in the previously proposed gate valve. Instead only the strong elastic restoring force exhibited by the annular elastic connecting sheets 34 is required. Further, in the previously proposed gate valve, in order to open or close the valve body by a single bellows an additional mechanism was provided, but in the gate valve in accordance with the present invention such a mechanism is eliminated and instead the valve plate $30_1$ and the counter plate $30_2$, each having the same constitution, perform the action of such a mechanism, making the opening or closing of the valve opening $1_1$ more rapid, and the constitution of the gate valve itself is greatly simplified.

It should be noted at this point, that, although in the present invention, the annular elastic connecting sheets 34 play a large part in revealing such excellent effects, they fundamentally differ in constitution, operation and effects from the metallic bellows 13 as used for carrying out the same operation in the previously proposed invention as shown in FIG. 3. This is because the metallic bellows 13 is shaped so that a number of corrugations are formed in the wall of a cylindrical tube made of thin metal sheet, or a number of annular thin metal sheets are superposed and adjoining sheets are welded together at their inner or outer peripheries so as to form a tubular body, the cylindrical body or tubular body thus formed performing its objective action by the elongation or contraction of the body itself, whereas, the annular elastic connecting sheets 34 in the present invention represent respectively annular shapes, each annular sheet being formed with at least one concentric corrugation $34_0$ perpendicular to the surface of the plate, and two of the sheets 34 thus formed are arranged in parallel with each other with a gap being left therebetween, where the annular elastic connecting sheets 34 can reveal such excellent properties as specific elasticity, particularly strong restoration force after having been elastically deformed, etc. In contrast, generally known bellows can not reveal such characteristic operations and effects comparable to those in the annular elastical connecting sheets in accordance with the present invention.

Further, since the annular elastic connecting sheets used as one of the essential constitutional elements in the present invention have specific elastic properties, it is not only applicable to a valve body in a gate valve, but it is also widely applicable to various apparatuses which need to reveal operations and effects similar to those in the present valve body.

It is to be understood that although a single form of the present invention has been illustrated and described, it is not to be limited to thereto except insofar as such limitations are included in the following claims:

We claim:

1. In a non-sliding gate valve for high vacuum use comprising a valve housing having a valve seat and a counter plate receiving seat surrounding a valve opening formed in said valve housing, and a valve body to close or open said valve seat and said counter plate receiving seat, an improvement wherein said valve body comprises a paired valve plate and a counter plate, said valve and counter plates each made of a circular thin metal plate having an outer diameter sufficient to close said valve seat and counter plate receiving seat respectively formed in said valve housing and each having its center line arranged in line with a center line of said valve opening and in parallel with said valve seat and said counter plate receiving seat as well as each other with gaps being left between said said valve plate and valve seat, between said valve and counter plates, and between said counter plate and said counter plate receiving seat, and a pair of inner support members arranged within said gap between said valve plate and said counter plate so as to be concentric with them and in parallel with each other, each of said inner support members having an outer diameter smaller than the outer diameter of said valve and counter plates, and an annular outer support member arranged radially outside said inner support member and made of an annular metal body having an inner diameter larger than the outer diameter of said valve and counter plates with a width substantially equal to the combined thicknesses of said inner support members, and a pair of diaphragm-like annular elastic connecting sheets arranged between the outer peripheries of said inner support members and the inner periphery of said outer support member, each annular elastic connecting sheet being made of a thin metal sheet, said valve and counter plates being sealingly connected to said inner support members, respectively, to confront them, the outer peripheries of said inner support members and the inner periphery of said outer support member being sealingly secured to said annular elastic connecting sheets at the inner and outer peripheries of said annular elastic connecting sheets, respectively, each of said annular elastic connecting sheets being formed with at lest one concentric corrugation on the surface thereof and perpendicular thereto, a sealed space being formed between said inner support members, said annular elastic connecting sheets and said outer support member.

2. A valve body as claimed in claim 1, wherein said valve and counter plates respectively have an annular shape and are sealingly connected at their inner diameter portion to annular projections formed on the outer surfaces of said inner support members.

* * * * *